United States Patent [19]
Barbano

[11] Patent Number: 6,125,378
[45] Date of Patent: Sep. 26, 2000

[54] METHOD AND APPARATUS FOR GENERATING FAMILIES OF CODE SIGNALS USING MULTISCALE SHUFFLING

[76] Inventor: Paolo Emilio Barbano, 77 E. 12 St., New York, N.Y. 10003

[21] Appl. No.: 09/229,614

[22] Filed: Jan. 13, 1999

[51] Int. Cl.[7] ....................................................... G06F 7/58
[52] U.S. Cl. .............................................................. 708/254
[58] Field of Search ................................... 708/254, 250, 708/253, 256

[56] References Cited

U.S. PATENT DOCUMENTS

| | | | |
|---|---|---|---|
| 5,327,365 | 7/1994 | Fujisaki et al. | 708/254 |
| 5,515,307 | 5/1996 | Aiello | 708/254 |
| 5,541,996 | 7/1996 | Ridenour | 708/254 |
| 5,727,063 | 3/1998 | Aiello et al. | 708/254 |
| 5,796,776 | 8/1998 | Lomp et al. | 708/254 |

*Primary Examiner*—David H. Malzahn
*Attorney, Agent, or Firm*—Cooper & Dunham LLP; Robert T. Maldonado

[57] ABSTRACT

A multi-scale shuffle is used in the generation of orthogonal and pseudo-orthogonal codes. A method for generating a family of pseudo-random orthogonal or pseudo-orthogonal code signals, comprises the steps of (1) generating a seed matrix of original dimensions, (2) performing a plurality of expansions on the seed matrix, each successive expansion producing a next generation matrix of larger dimensions, the last of the expansions including replication and shuffling of a parent generation matrix to produce a child generation matrix, and (3) output row of the final matrix as the family code signals. The shuffling may comprise a pseudo-random re-ordering of matrix column indices. The replication and shuffling may comprise forming a child generation matrix by operations that include combining a reproduction of the parent matrix and a shuffled reproduction of the parent matrix. The replication and shuffling also may comprise forming an intermediate matrix by operations that include combining a reproduction of the parent matrix, a modified reproduction of the parent matrix, a shuffled reproduction of the parent matrix, and a modified shuffled reproduction of the parent matrix, and then shuffling the intermediate matrix to form the child matrix.

24 Claims, 9 Drawing Sheets

FIG. 4

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

FIG. 5

$[i \quad 1 \ -i \ -1 \ -1 \quad 1 \quad i \ -i]$

FIG. 6

$$\begin{bmatrix} i & 1 & -i & -1 & -1 & 1 & i & -i \\ i & -1 & -i & -1 & 1 & -1 & -i & i \\ i & 1 & i & 1 & -1 & 1 & -i & i \\ i & -1 & i & -1 & -1 & -1 & -i & -i \\ i & 1 & -i & -1 & 1 & -1 & -i & i \\ i & -1 & -i & 1 & 1 & 1 & -i & -i \\ i & 1 & i & 1 & 1 & -1 & i & -i \\ i & -1 & i & -1 & 1 & 1 & i & i \end{bmatrix}$$

METHOD AND APPARATUS FOR GENERATING FAMILIES OF CODE SIGNALS USING MULTISCALE SHUFFLING

FIELD OF THE INVENTION

This invention relates to generation of code signals, such as pseudo-noise signals, and more particularly to a method for generating families of orthogonal and pseudo-orthogonal codes and code-modulated waveforms. The codes can be used in a variety of applications including, but not limited to, communication systems such as spread spectrum communication systems, encryption of data, pictures, and audio, and the generation of signals for radar applications.

BACKGROUND OF THE INVENTION

Pseudo-noise codes are used in various applications, including those listed above. So-called "spread spectrum" communication uses noise-like carrier waves, and a bandwidth that is much wider than conventional point-to-point communication at the same data rate. Among the advantages are: excellent noise immunity, relatively low power consumption, and reduction or elimination of the effects of multipath fading. Code division multiple access ("CDMA") is a form of spread spectrum that has gained popular acceptance by cellular radio system operators as a technique that increases system capacity and service quality. Different users can occupy the same communication channel; this being achieved by assigning to each user a distinctive pseudo-noise code that can be recognized by the intended user but is, ideally, received as noise by the other users.

The ability to quickly generate families of pseudo-noise codes with minimal computation and cost is very advantageous for the described types of applications, but has been difficult to achieve in the prior art. Accordingly, it is among the objects of the present invention to provide a method and apparatus for efficiently generating families of pseudo-noise codes and code signals.

SUMMARY OF THE INVENTION

The present invention employs a multi-scale shuffle in the generation of orthogonal and pseudo-orthogonal codes. Interleaving operations are used that are of a type related to so-called "Finite Gelfand Pairs".

In accordance with an embodiment of the invention, a method is provided for generating a family of pseudo-random orthogonal or pseudo-orthogonal code signals, comprising the following steps: generating a seed matrix of original dimensions; performing a plurality of expansions on the seed matrix, each successive expansion producing a next generation matrix of larger dimensions, the last of the expansions producing a final matrix; at least some of the expansions including replication and shuffling of a parent generation matrix to produce a child generation matrix; and outputting rows of the final matrix as the family of code signals.

In a preferred embodiment of the invention, the shuffling comprises a pseudo-random re-ordering of matrix column indices. In a form of this embodiment, the replication and shuffling comprises forming a child generation matrix by operations that include combining a reproduction of the parent matrix and a shuffled reproduction of the parent matrix. In another form of this embodiment, the replication and shuffling comprises forming an intermediate matrix by operations that include combining a reproduction of the parent matrix, a modified reproduction of the parent matrix, a shuffled reproduction of the parent matrix, and a modified shuffled reproduction of the parent matrix, and then shuffling the intermediate matrix to form the child matrix.

The code generation hereof has several advantages, among which are the following: (1) The codes have additive white Gaussian white noise (AWGN) statistics and present ideal noise-like auto- and cross-correlation properties. (2) The codes exhibit full non-linearity; that is, the codes are not generated with linear transformations, such as shift-register sequences or Gold-codes. This enhances their use for covert-comm applications. (3) The codes have the property of non-detectability; that is an overlayed version of the codes is non-detectable in the sense of Knuth's R4 property. (4) Flexibility is provided in the choice of the number of phases. The codes can be chosen to have any number 2·n phases to adapt to different applications, and do not have to be quantized in order to be implemented. This results in a better performance at the auto- and cross-correlation level. (5) The technique hereof provides fast generation. The complete frame of N multiscale codes of length N requires only N-log N computations, for any number of phases.

Further features and advantages of the invention will become more readily apparent from the following detailed description when taken in conjunction with the accompanying drawings.

BRIEF DESCRIPTION OF THE DRAWINGS

FIG. 4 illustrates an 8×8 matrix containing orthogonal binary values, the first eight Walsh functions being used as an example.

FIG. 5 is an example of an overlay utilized in the illustrative embodiment set forth.

FIG. 6 is an example of a seed matrix formed by applying the overlay of FIG. 5 to the source matrix of FIG. 4.

DETAILED DESCRIPTION

Figure 1:
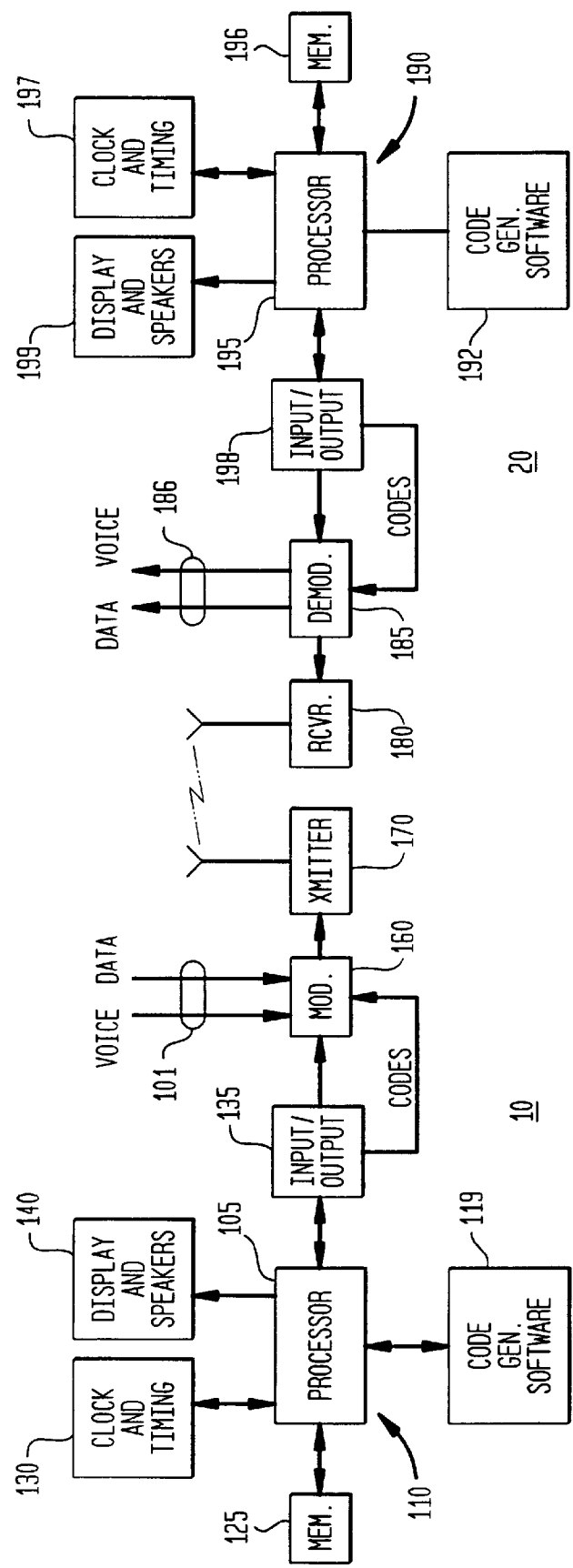
FIG. 1 is a block diagram of an example of the type of system in which an embodiment of the invention can be employed.

Referring to FIG. 1, there is shown a block diagram of one example of a type of system in which the technique of the present invention can be utilized. This example involves communication between a transmitter station 10 and a receiver station 20, using a spread spectrum type of communication. It will be understood that the techniques hereof for generating codes, and the codes generated thereby, will have application in many other types of systems (some of these having been mentioned in the background portion hereof) where a family or families of pseudo-random orthogonal codes or pseudo-orthogonal codes are needed, and the example set forth should not be construed in a limiting sense. Also, in the example of FIG. 1, there may typically be a plurality or many transmitting and/or receiving stations in a given application.

In the FIG. 1 example, the families of code signals are generated using an appropriately programmed general purpose processor subsystem 110, with the code generation software 119 being loaded in a memory of the processor subsystem and/or available from any suitable storage medium. The processor or CPU 105 of processor subsystem 110 may be any suitable processor, for example an electronic digital or analog processor or microprocessor. It will be understood that any general purpose or special purpose processor, or other machine or circuitry that can perform the computations and signal generation as described herein, can be utilized. The processor subsystem which will typically include memories 125, clock and timing circuitry 130, input/output functions 135, and display and speaker functions 140, which may all be of conventional types.

The output codes are available from the processor subsystem 110 and, in this example, are used for modulating information 101 to be transmitted. The information to be transmitted may, for example, be voice and/or data, or any other suitable type of information, which may be in analog or digital form, it being understood that the modulator subsystem 160 may include analog to divisional conversion circuitry. It will also be understood that the modulator subsystem 160 may be of a type that is well known in the art, and is not, per se, an inventive feature hereof. The resultant signals, which may be, for example, spread spectrum signals, are transmitted by an antenna 172 of a transmitter 170.

At the receiver station 20, a receiver antenna 182 is coupled with receiver 180 and demodulator (or detector) subsystem 185, both of which can be of types known in the art. The subsystem 185, which includes a demodulator circuit, receives, from processor subsystem 190, the family of code signals that are used in the detection process. In some applications, the codes will be available and stored at the receiver station beforehand, and there would be no need to provide a means for generating the codes signals at the receiver station. In other applications, and as illustrated in the example of FIG. 1, the code generating software (represented as being loaded in a memory 192 of processor subsystem 190) is provided, and the family of codes signals can be generated in the same manner as at the transmitter subsystem and used in the detection process, for example in applications where it is desirable to enhance the security of transmitted information by changing the family of codes from time to time. As in the transmitter station, the processor subsystem of the receiver station can be provided with any suitable processor or CPU 195, and associated memories 196, clock and timing circuitry 197, input/output functions 198, and display and speaker functions 199. The recovered information, which is output from the demodulator subsystem, is represented at 186.

Figure 2:
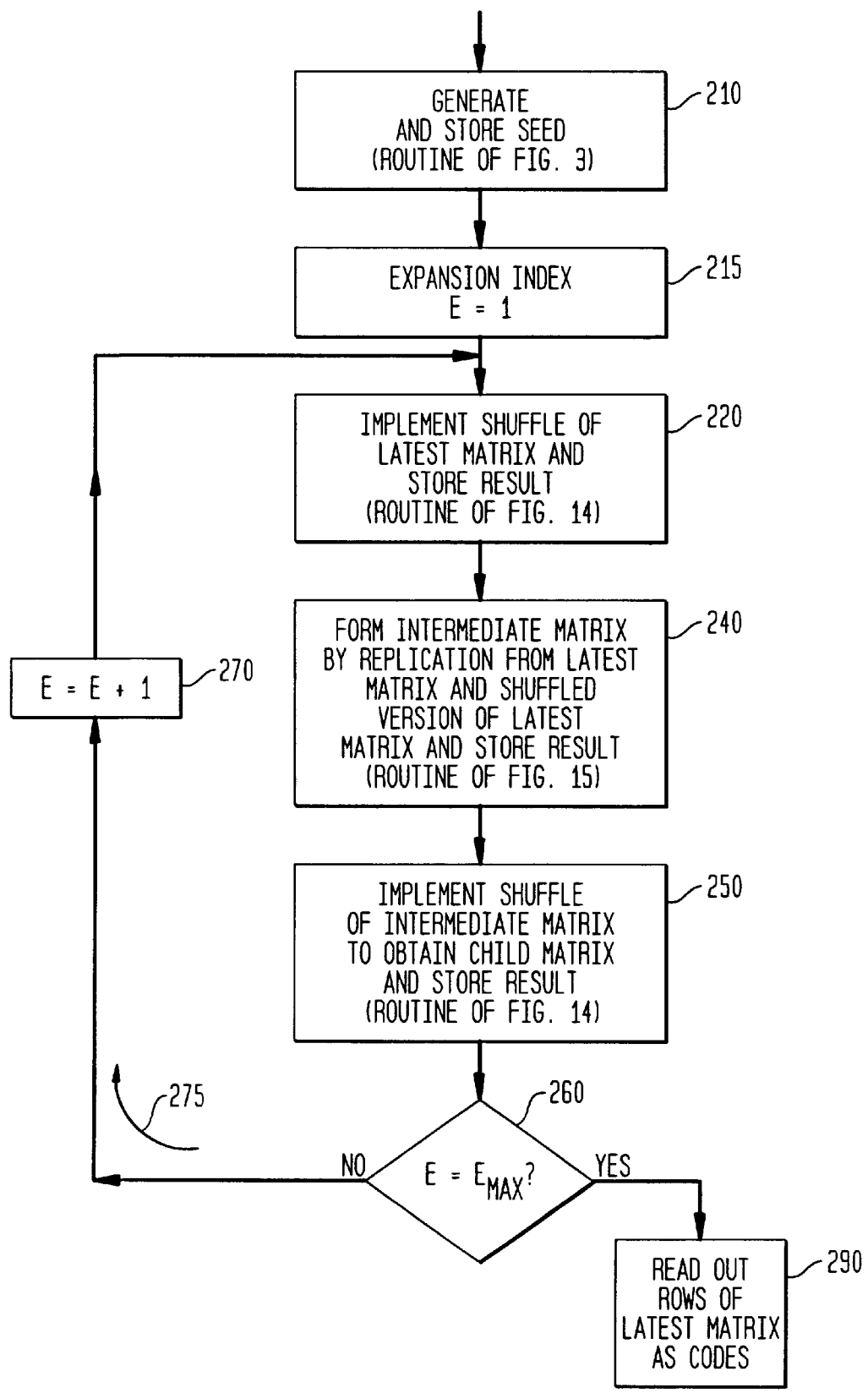
FIG. 2 is a flow diagram of a routine which, when taken in conjunction with the routines referred to therein, can be used to control a processor to implement generation of a family of pseudo-random orthogonal codes or pseudo-orthogonal codes in accordance with an embodiment of the invention.
Figure 3:
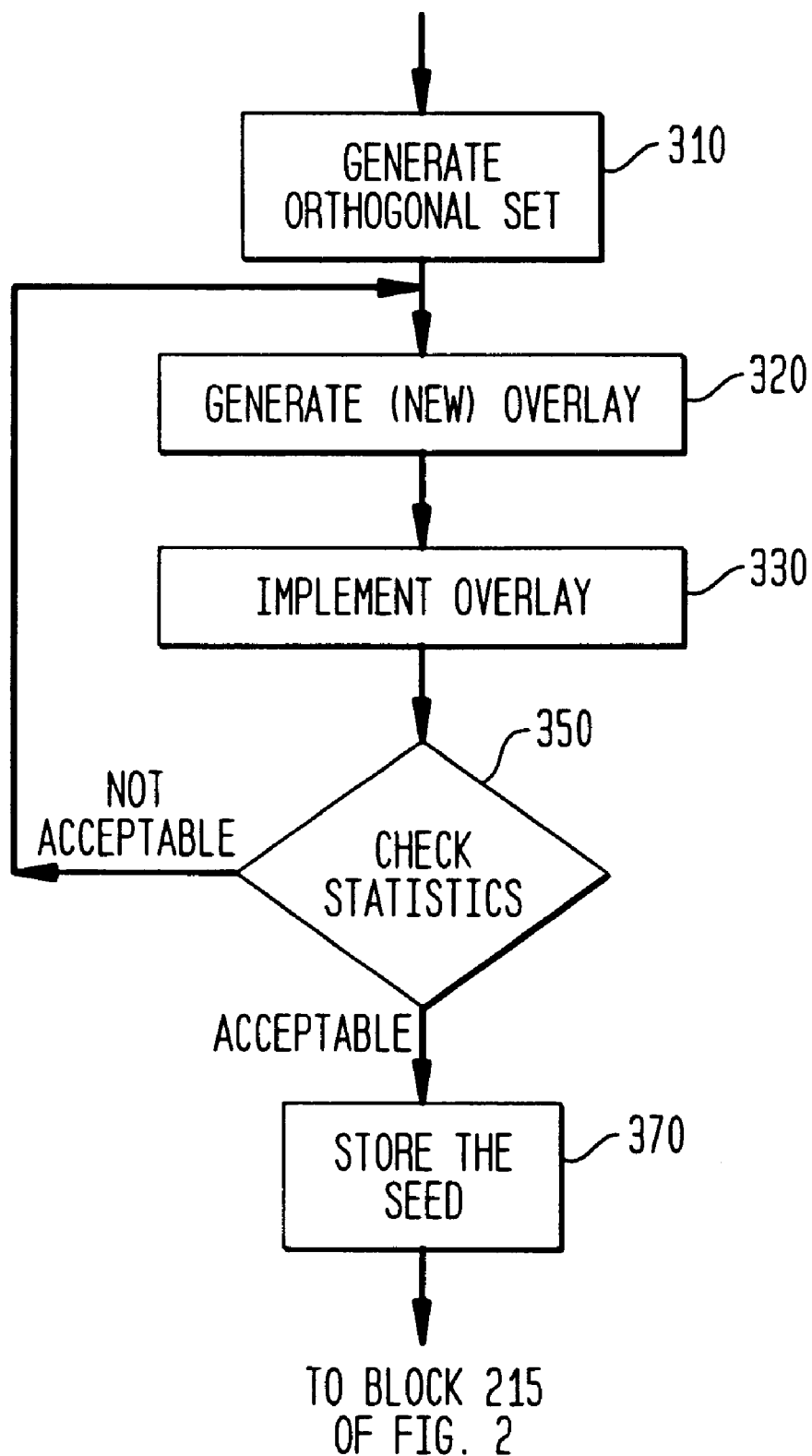
FIG. 3 is a flow diagram of a routine for generating a seed matrix that is used as a starting source for obtaining codes produced with an embodiment of the invention.

FIG. 2 is a flow diagram of a routine which, when taken in conjunction with the routines referred to therein, can be used to control the processor (such as the processor subsystem 110 and/or 190 of FIG. 1) to implement generation of a family of pseudo-random orthogonal codes in accordance with an embodiment of the invention. The block 210 represents the generation and storage of starting seed in the form of a seed matrix, and the routine therefor is set forth in conjunction with the flow diagram of FIG. 3. An expansion index, E, is initialized at 1 (block 215). In the subsequent portion of the routine, a number of expansions are performed on the original seed matrix. This will be described in detail hereinbelow, after describing the seed generation and illustrating the matrix expansions. FIG. 3 shows a flow diagram of a routine, represented by the block 210 of FIG. 2, for generating the seed matrix that is used as a starting source for obtaining the codes produced in the present embodiment of the invention. The seed generation is not, per se, an inventive feature hereof, and it will be understood that the seed can be generated using the technique to be described and/or any other suitable technique. In the flow diagram of FIG. 3, the block 310 represents the generating of an orthogonal set of values which, for ease of illustration in a present example, may be an 8x8 matrix containing binary values such as the first eight Walsh functions. These are illustrated in matrix form in FIG. 4. The block 320 represents generating on overlay which, in the present simplified illustrative example, is an 8x1 matrix of four phase complex numbers, for example as shown in FIG. 5, preferably with the phases about evenly distributed. As represented by the block 330 of the flow diagram of FIG. 3, the overlay (e.g. of FIG. 5) is applied to the source matrix (e.g. of FIG. 4) by multiplying the overlay by each row of the source matrix, to provide, for example, the seed matrix as illustrated in FIG. 6. As is known in the art, the overlay maintains the orthogonality or unitary property, as the case may be, of the matrix rows. Next, the block 350 of the routine of FIG. 3 is entered, this block representing the performing of a statistical check on the seed matrix. As is known in the art, the statistical check looks for certain undesirable features or patterns, for example the existence of a row of the seed matrix that correlates well with an offset of another row of the seed matrix. Description of a suitable technique can be found in R. Dixon, "Spread Spectrum Systems With Commercial Applications", Third Edition, 1994. If the statistical check indicates that the seed matrix is suitable (the "acceptable" output of decision block 350), the seed matrix is stored (block 370) and is output to block 220 for use in the routine of FIG. 2. If not, the block 320 is re-entered for generation of a new overlay, and the process is repeated until an acceptable seed is produced. [It will be understood that a new overlay, a new orthogonal set, or both, can be used.]

Figure 7:
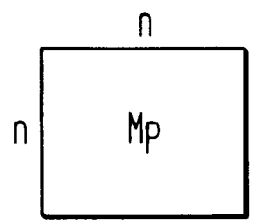
FIG. 7 represents an n×n matrix to be expanded in accordance with an illustrative example of an embodiment of the invention.

FIGS. 7–13 illustrate a form of matrix expansion, as utilized in an embodiment of the invention. The replication and shuffling used in the matrix expansion provides a computationally efficient technique for generating the desired families of pseudo-random orthogonal or pseudo-orthogonal codes. FIG. 7 represents an nxn matrix to be expanded in accordance with an example of the present embodiment. A matrix to be expanded is designated as a parent matrix, $M_P$, and the matrix which ultimately results from the expansion is designated as a child matrix, $M_C$. In a preferred embodiment hereof, an expansion from the parent matrix $M_P$ to the child matrix $M_C$ uses a multi-level shuffle which, in a form thereof, involves shuffling of the parent matrix and forming of an intermediate matrix (designated $M_I$) by replication that combines a copy or copies of the parent matrix (and/or variations thereof) and a copy or copies of the shuffled parent matrix (and/or variations thereof). Then, the intermediate matrix is itself shuffled to obtain the child matrix. The procedure is summarized in FIG. 8. In embodiments hereof, the shuffling can be achieved by shuffling the column indices of the matrix being shuffled, and this involves minimal computation, time, and memory.

Figure 8:
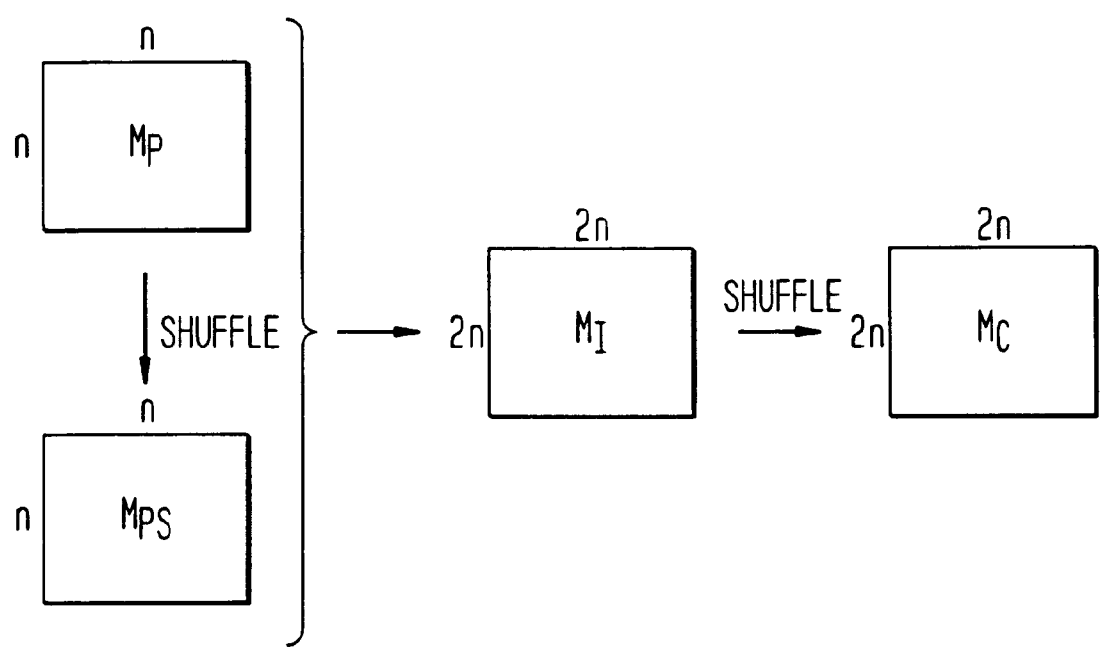
FIG. 8 summarizes the procedure of matrix expansion from a parent matrix to a child matrix in accordance with an embodiment of the invention.
Figure 9:
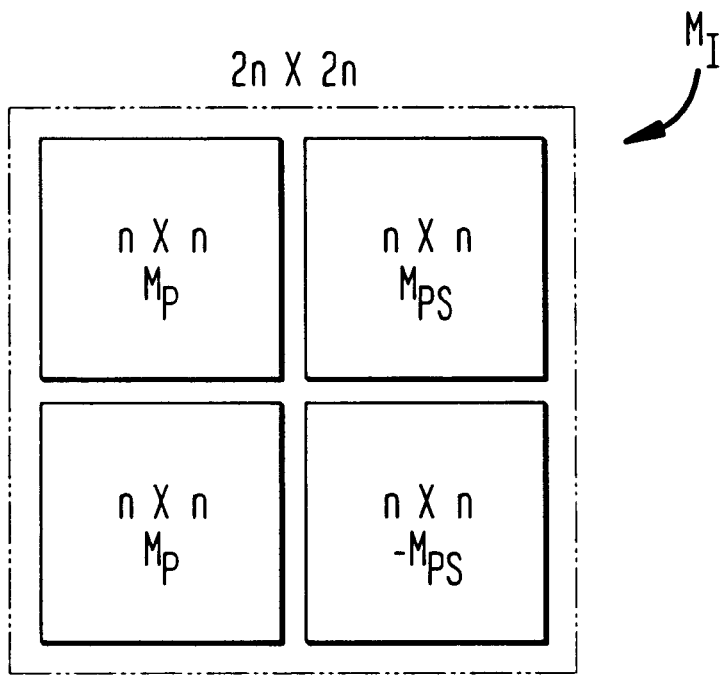
FIG. 9 shows formation of an intermediate matrix in accordance with an illustrative embodiment of the invention.
Figure 10:
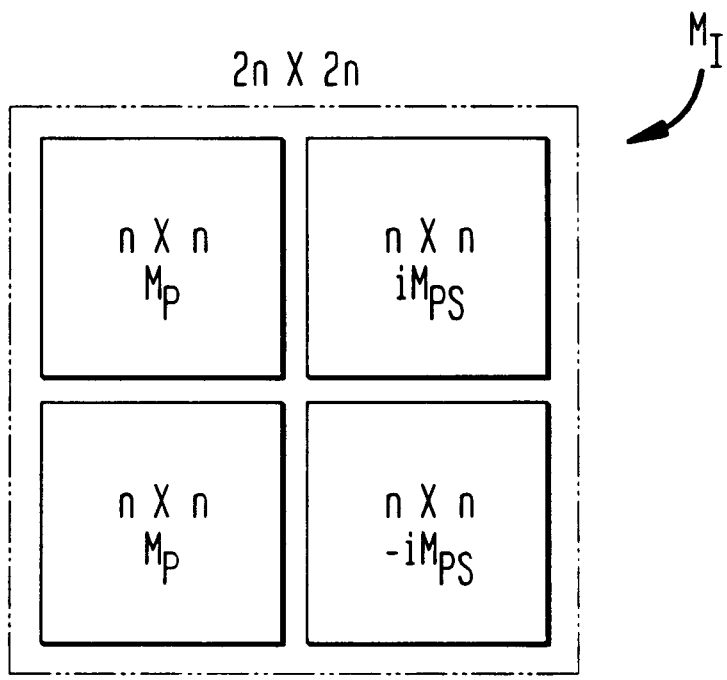
FIG. 10 shows formation of another intermediate matrix in accordance with another illustrative embodiment of the invention.
Figure 11:
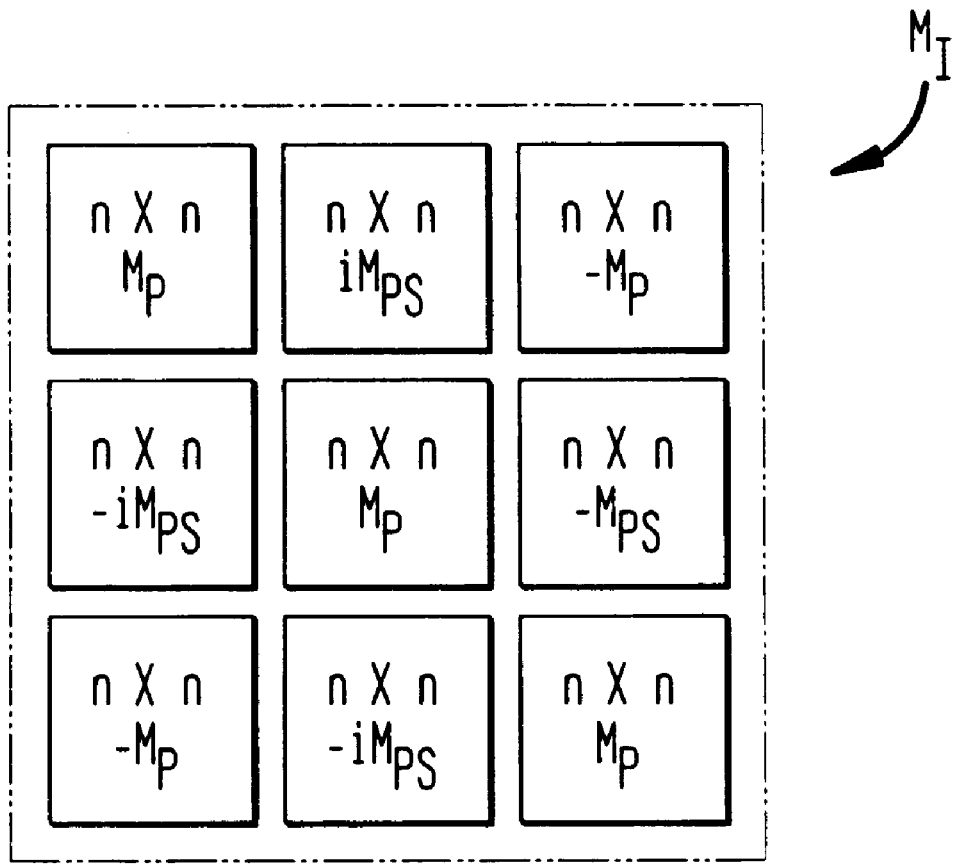
FIG. 11 shows formation of still another intermediate matrix in accordance with another illustrative embodiment of the invention.
Figure 12:
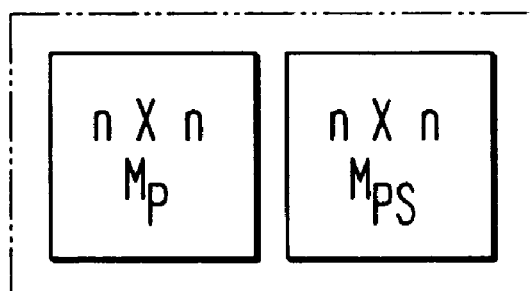
FIG. 12 shows formation of still another intermediate matrix in accordance with another illustrative embodiment of the invention.
Figure 13:
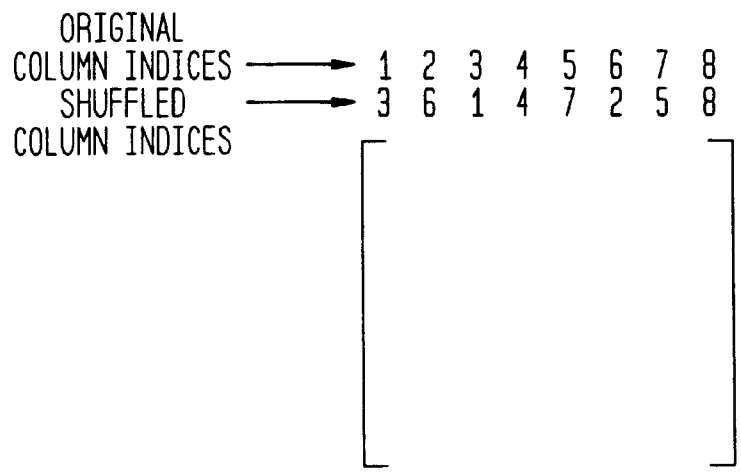
FIG. 13 illustrates a form of shuffling by pseudo-random reordering of the column indices of the matrix being shuffled.

In the FIG. 8 example, matrix $M_P$ is shuffled to produce a shuffled matrix $M_{PS}$. Then, these matrices, and/or variations thereof [for example, the matrix multiplied by $-1$ (that is, where each element of the matrix is multiplied by $-1$), or the matrix multiplied by i (that is, where each element of the matrix is multiplied by the imaginary operator, i)] are replicated to obtain an intermediate matrix, which is designated $M_I$. Examples of the formation of the intermediate matrix are illustrated in FIG. 9 and 10, where the parent matrix is an n×n matrix and the intermediate matrix is a (2n)×(2n) matrix. In each case, the intermediate matrix includes at least one version of the parent matrix (or a variation thereof) and one version of a shuffled parent matrix (or a variation thereof). In particular, starting in the upper left-hand corner and going clockwise, the intermediate matrix of FIG. 9 combines $M_P$, $M_{PS}$, $-M_{PS}$ and $M_P$, and the intermediate matrix of FIG. 10 combines $M_P$, $iM_{PS}$, $-iM_{PS}$ and $M_P$. It will be understood that while four versions of the parent matrix and shuffled parent matrix (or variations thereof) are used in an example of the present embodiment, other numbers could be used, for example as shown in FIGS. 11 or 12, it being understood that the resultant intermediate matrix need not be a square matrix (as in the intermediate 2n×n matrix of FIG. 12).

Referring again to FIG. 8, in the present embodiment the intermediate matrix $M_I$ is itself shuffled, and the shuffled version thereof is the child matrix, $M_C$.

The shuffling is preferably a pseudo-random reordering of the column indices of the matrix being shuffled. In an embodiment hereof, shuffling is implemented by multiplying the column indices by a number (which is preferably, but not necessarily, a prime), modulo the number of columns of the matrix. This is illustrated, for example, in FIG. 13 which shows a matrix having 8 columns, and wherein the multiplier selected for the shuffle is 11. The original column indices (1, 2, 3, . . . 8) are shown above the shuffled indices. For example, the original column 1 of the matrix, after the shuffle of this example, becomes column 3 of the shuffled matrix [1×11=44 (modulo 8)=3], and the original column 2 of the matrix, after the shuffle, becomes column 6 of the shuffled matrix [2×11=22 (modulo 8)=6], and so on.

Referring again to the flow diagram of FIG. 2, the block 220 represents implementing of a shuffle on the latest matrix (which, for the first traversal of the loop, would be the seed matrix), and storage of the result. The routine for implementation of a shuffle is set forth in conjunction with the flow diagram of FIG. 14. An intermediate matrix is then formed from the latest matrix and the shuffled version of the latest matrix (and variations thereof), as represented by the block 240. This is the technique that was illustrated in conjunction with FIGS. 9–12, and it is described in further detail in conjunction with the flow diagram of FIG. 15. The resultant intermediate matrix is then shuffled (block 250) to obtain the child matrix, which is stored. The shuffle routine of FIG. 14 can again be used for this purpose. Inquiry is then made (decision block 260) as to whether the last expansion has been implemented; that is, whether the expansion index E has reached its predetermined maximum, $E_{max}$. If not, the expansion index is incremented (block 270) and the block 220 is re-entered. The loop 275 then continues until the last expansion has been performed. When the last expansion has been performed (the number of expansions being determined beforehand for a given application, depending on considerations including the size of the initial starting seed and the desired code size), the rows of the ultimately expanded matrix are read out (block 290) as the pseudo-random orthogonal or pseudo-orthogonal code signals. The codes can be used immediately and/or stored for future use.

Figure 14:
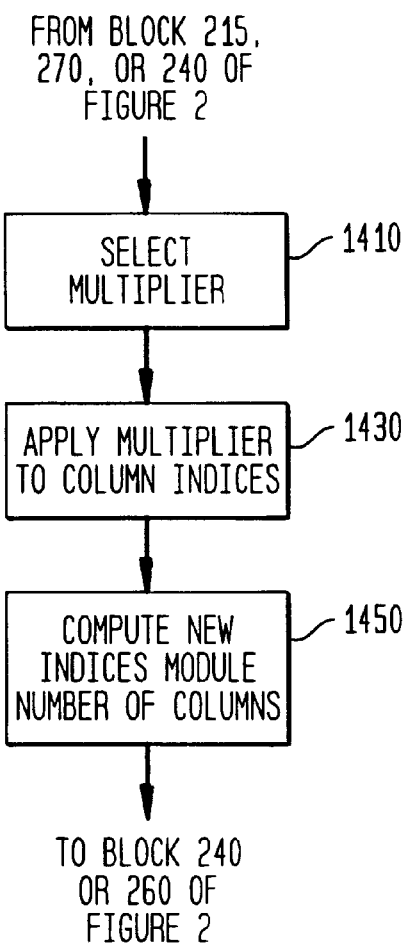
FIG. 14 is a flow diagram of a routine for implementing a shuffle in accordance with an embodiment of the invention.

Referring to FIG. 14, there is shown a routine for implementing the shuffle represented by the block 220 or the block 250 of FIG. 2. In the present embodiment, the shuffle implements a pseudo-random mixing or re-arranging of the matrix columns; that is, a mixing of the digits of each code in progress. It will be understood that other techniques could be used to implement the shuffling. In the FIG. 14 embodiment, the block 1410 represents the selecting of a multiplier to be used in the shuffle. As previously noted, the multiplier is preferably a prime, and the multipliers to be used may, for example, be selected beforehand. The block 1430 is then entered, this block representing the applying of the multiplier to the column indices of the matrix being processed. Then, as represented by block 1450, the new indices are computed, as previously described, by taking each product (that resulted from the multiplication just performed) modulo the number of columns in the matrix (thus, employing the procedure that was illustrated in conjunction with FIG. 13).

Figure 15:
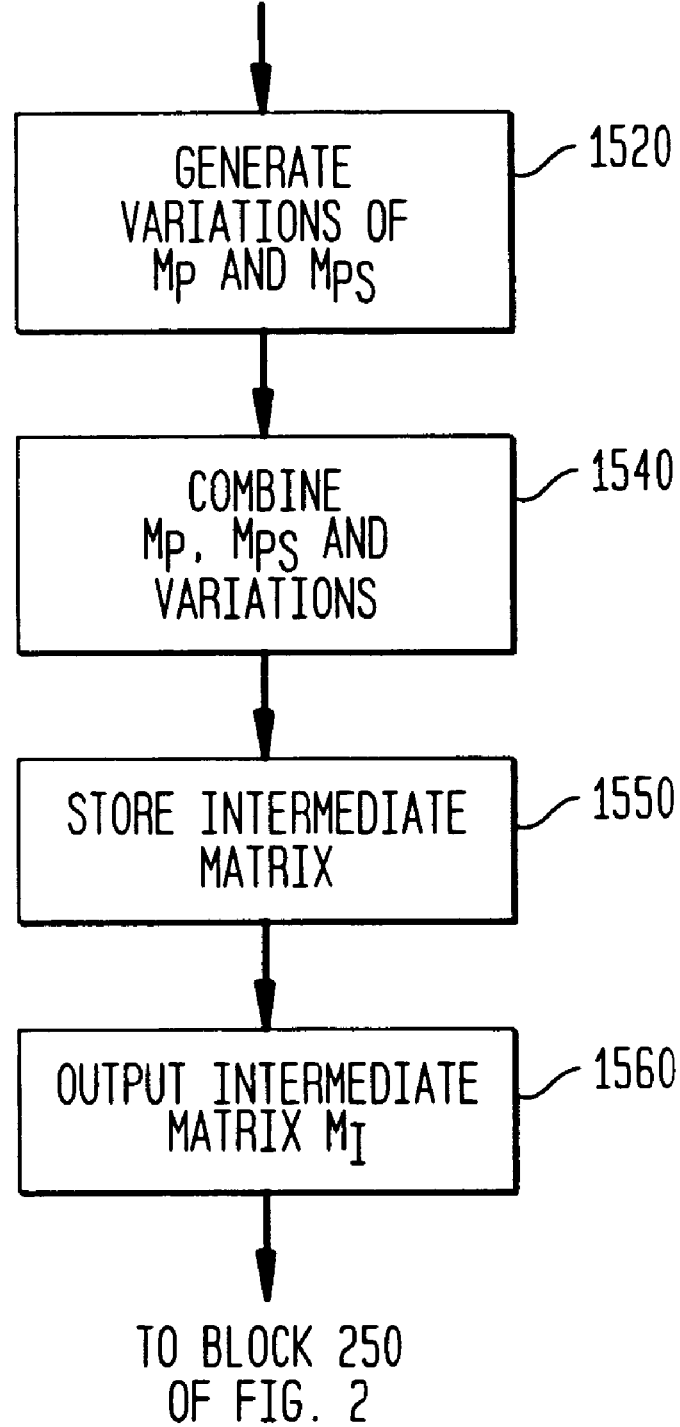
FIG. 15 is a flow diagram of a routine for forming an intermediate matrix in accordance with an embodiment of the invention.

Referring to FIG. 15, there is shown a routine for implementing the intermediate matrix formation by replication, using the parent matrix $M_P$, the shuffled parent matrix $M_{PS}$, and variations thereof, as illustrated in the examples of FIGS. 9–12. In preferred embodiments where variations of $M_P$ and $M_{PS}$ are used (as in FIGS. 9–11), the variations are formed by simple sign change and/or application of the imaginary operator. The matrices $M_P$, $M_{PS}$, and the variations are then combined (block 1540) to form the intermediate matrix, $M_I$, and the intermediate matrix is stored (block 1550) and output (block 1560) to block 250 of FIG. 2.

What is claimed is:

1. A method for generating a family of pseudo-random orthogonal or pseudo-orthogonal code signals, comprising the steps of:

generating a seed matrix of original dimensions;

performing a plurality of expansions on the seed matrix, each successive expansion producing a next generation matrix of larger dimensions, the last of said expansions producing a final matrix;

at least some of said expansions including replication and shuffling of a parent generation matrix to produce a child generation matrix; and outputting rows of said final matrix as said family of code signals.

2. The method as defined by claim 1, wherein said shuffling comprises a pseudo-random re-ordering of matrix column indices.

3. The method as defined by claim 2, wherein said replication and shuffling comprises forming a child generation matrix by operations that include combining a reproduction of said parent matrix and a shuffled reproduction of said parent matrix.

4. The method as defined by claim 2, wherein said replication and shuffling comprises forming an intermediate matrix by operations that include combining a reproduction of said parent matrix and a shuffled reproduction of said parent matrix, and then shuffling said intermediate matrix to form said child matrix.

5. The method as defined by claim 4, wherein said pseudo-random re-ordering is implemented by multiplying said matrix column indices by a first number, taken modulo a second number.

6. The method as defined by claim 2, wherein said replication and shuffling comprises forming an intermediate matrix by operations that include combining a reproduction of said parent matrix, a modified reproduction of said parent matrix, a shuffled reproduction of said parent matrix, and a modified shuffled reproduction of said parent matrix, and then shuffling said intermediate matrix to form said child matrix.

7. The method as defined by claim 6, wherein said step of performing a plurality of expansions on the seed matrix comprises performing several expansions on the seed matrix.

8. The method as defined by claim 2, wherein said step of performing a plurality of expansions on the seed matrix comprises performing several expansions on the seed matrix.

9. The method as defined by claim 2, wherein said pseudo-random re-ordering is implemented by multiplying said matrix column indices by a first number, taken modulo a second number.

10. The method as defined by claim 1, wherein said replication and shuffling comprises forming a child generation matrix by operations that include combining a reproduction of said parent matrix and a shuffled reproduction of said parent matrix.

11. The method as defined by claim 10, wherein said replication and shuffling comprises forming a child generation matrix by operations that include combining a reproduction of said parent matrix, a modified reproduction of said parent matrix, a shuffled reproduction of said parent matrix, and a modified shuffled reproduction of said parent matrix.

12. The method as defined by claim 10, wherein said replication and shuffling comprises forming a child generation matrix by operations that include combining a reproduction of said parent matrix, a modified reproduction of said parent matrix, a shuffled reproduction of said parent matrix, and a modified shuffled reproduction of said parent matrix.

13. The method as defined by claim 1, wherein said replication and shuffling comprises forming an intermediate matrix by operations that include combining a reproduction of said parent matrix and a shuffled reproduction of said parent matrix, and then shuffling said intermediate matrix to form said child matrix.

14. The method as defined by claim 1, wherein said replication and shuffling comprises forming an intermediate matrix by operations that include combining a reproduction of said parent matrix, a modified reproduction of said parent matrix, a shuffled reproduction of said parent matrix, and a modified shuffled reproduction of said parent matrix, and then shuffling said intermediate matrix to form said child matrix.

15. The method as defined by claim 1, wherein said step of performing a plurality of expansions on the seed matrix comprises performing several expansions on the seed matrix.

16. A method for generating a family of pseudo-random orthogonal or pseudo-orthogonal codes, comprising the steps of:

generating a seed matrix of original dimensions;

performing several expansions on the seed matrix, each successive expansion producing a next generation matrix of larger dimensions, the last of said expansions producing a final matrix;

each of said expansions including replication and shuffling of a parent generation matrix to produce a child generation matrix, said replication and shuffling comprising forming an intermediate matrix by operations that include combining a reproduction of said parent matrix, a modified reproduction of said parent matrix, a shuffled reproduction of said parent matrix, and a modified shuffled reproduction of said parent matrix, and then shuffling said intermediate matrix to form said child matrix; and outputting rows of said final matrix as said family of codes.

17. The method as defined by claim 16, wherein said shuffling comprises a pseudo-random re-ordering of matrix column indices.

18. The method as defined by claim 17, wherein said pseudo-random re-ordering is implemented by multiplying said matrix column indices by a first number, taken modulo a second number.

19. Apparatus for generating a family of pseudo-random orthogonal or pseudo-orthogonal code signals, comprising:

means for generating a seed matrix of original dimensions;

means for performing a plurality of expansions on the seed matrix, each successive expansion producing a next generation matrix of larger dimensions, the last of said expansions producing a final matrix; at least some of said expansions including replication and shuffling of a parent generation matrix to produce a child generation matrix; and means for outputting rows of said final matrix as said family of code signals.

20. Apparatus as defined by claim 19, wherein said replication and shuffling comprises forming a child generation matrix by operations that include combining a reproduction of said parent matrix and a shuffled reproduction of said parent matrix.

21. A method for generating a family of code signals, comprising the steps of:

generating a seed matrix of original dimensions;

performing a plurality of expansions on the seed matrix, each successive expansion producing a next generation matrix of larger dimensions, the last of said expansions producing a final matrix;

at least some of said expansions including replication and shuffling of a parent generation matrix to produce a child generation matrix; and outputting rows of said final matrix as said family of code signals.

22. The method as defined by claim 21, wherein the rows of said seed matrix are orthogonal, and said code signals are othogonal.

23. The method as defined by claim 22, wherein said shuffling comprises a pseudo-random re-ordering of matrix column indices.

24. The method as defined by claim 21, wherein said replication and shuffling comprises forming a child generation matrix by operations that include combining a reproduction of said parent matrix and a shuffled reproduction of said parent matrix.

* * * * *